J. SMITH.
TRACK AND HANGER.
APPLICATION FILED JULY 28, 1908.
906,948.
Patented Dec. 15, 1908.
2 SHEETS—SHEET 1.
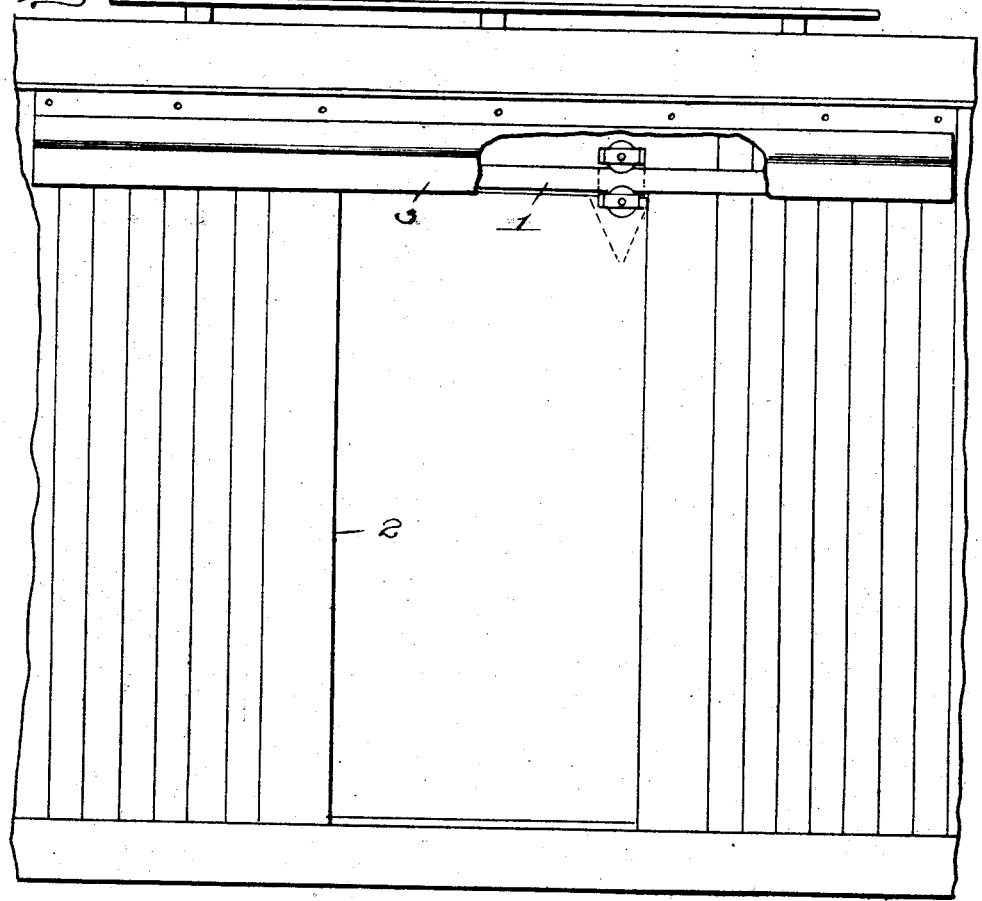
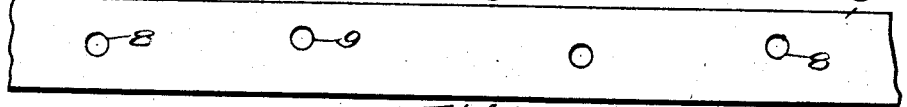
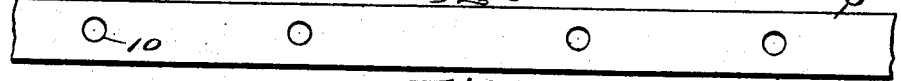
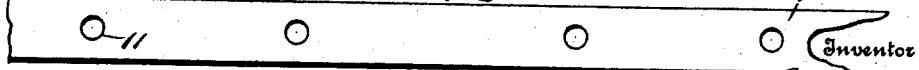
Witnesses
J. M. Fowler Jr.
Inventor
Jacob Smith
By Mason Fenwick Lawrence
his Attorneys

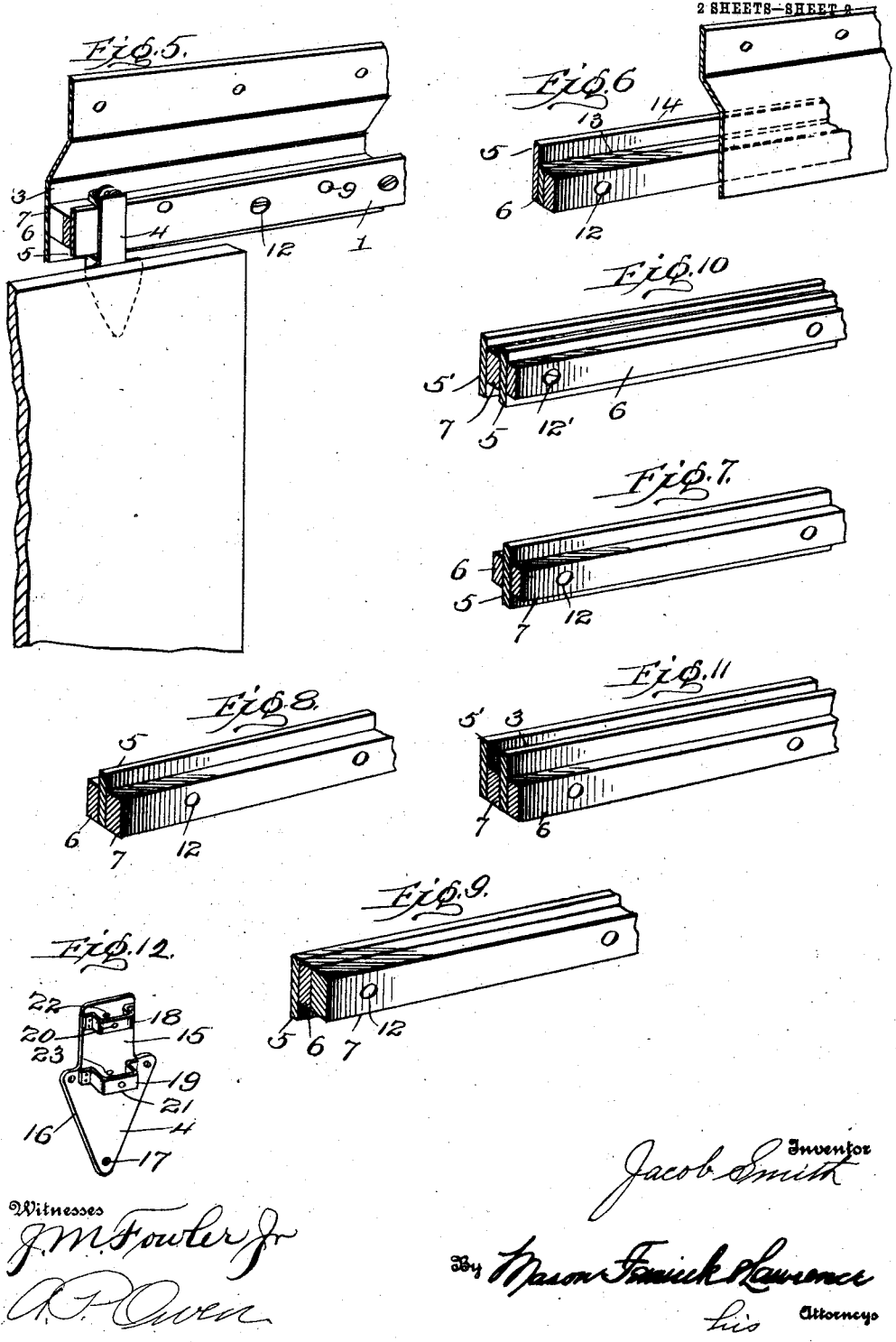

UNITED STATES PATENT OFFICE.

JACOB SMITH, OF SCRANTON, PENNSYLVANIA.

TRACK AND HANGER.

No. 906,948.  Specification of Letters Patent.  Patented Dec. 15, 1908.

Application filed July 28, 1908. Serial No. 445,792.

*To all whom it may concern:*

Be it known that I, JACOB SMITH, a citizen of the United States, residing at Scranton, in the county of Lackawanna and State of Pennsylvania, have invented certain new and useful Improvements in Tracks and Hangers; and I do hereby declare the following to be a full, clear, and exact description of the invention, such as will enable others skilled in the art to which it appertains to make and use the same.

This invention relates to improvements in tracks and hangers, and particularly to tracks and hangers for sliding car doors, and has for an object the provision of a track that may have its various parts interchangeable for accommodating different kinds of hangers and for mounting the hangers in different relative position.

Another object in view is the provision of a track formed with a plurality of parts that may be variously transposed and rearranged for presenting different constructions for presenting a track particularly adapted for a particular kind of car and a particular kind of hanger.

A further object in view is the provision of a track formed in parts that may be rearranged so that at one time the hangers may rest against an edge of one of the bars of the track and at another time travel along the top of one bar guided by an adjoining bar projecting beyond the surface of the bar upon which the hanger is mounted for guiding the hanger in its movement.

A still further object in view is the provision of a hanger that may be stamped or cut out of a single piece of material and provided with one or more brackets for receiving traction wheels or other supporting means.

With these and other objects in view the invention comprises certain novel constructions, combinations, and arrangement of parts as will be hereinafter more fully described and claimed.

In the accompanying drawings: Figure 1 is a side elevation of part of a car showing a track and hanger formed according to the present invention connected therewith. Fig. 2 is one of the bars forming part of the track, the same being formed with a plurality of holes or apertures passing therethrough in different planes. Figs. 3 and 4 are plan views of bars used in connection with the bar shown in Fig. 2 but arranged with holes or apertures in the same plane. Fig. 5 is a fragmentary view of a track shown in connection with a hanger and associated parts. Fig. 6 is a fragmentary perspective view of a track with the various bars making up the track arranged in a slightly different manner from that shown in Fig. 5, the track being shown in connection with a hood. Fig. 7, 8, and 9 are fragmentary perspective views of the track with the bars making up the same arranged in various manners for accommodating various kinds of hangers. Figs. 10 and 11 are fragmentary perspective views of a slightly modified form of track. Fig. 12 is a perspective view of a hanger detached, and with a plurality of brackets secured thereto for receiving anti-friction means.

In the construction of tracks for sliding doors heretofore it has been customary to make a track in some particular manner so as to accommodate a particularly constructed hanger and after the track has been placed in position it will operate only with the particularly constructed hanger. Also tracks as heretofore constructed when complete and mounted in position, or previous to their mounting, can not be varied without destroying part of the track and at a considerable expense. These objections and disadvantages are aimed to be overcome in the present invention as by the provision of a plurality of bars a track is presented that may be rearranged and placed in position so as to accommodate any desired kind of hanger. All that would be necessary is to secure the respective bars and securing bolts making up the track, and then the bars may be arranged to fit each particular kind of hanger that is used, and also may be arranged to fit inside of the door or outside of the same as may be most desirable.

In the accompanying drawings is disclosed a track embodying the features of my invention in which, 1 indicates a track mounted upon a car 2. Preferably the track 1 is secured to a hood 3 though it will be evident that the track may be secured to the car if it is so desired. The hood 3 passes up and is secured to the car above the track and permits the free reciprocation of a hanger 4 upon the track. The track 1 is formed with a comparatively wide bar 5 and comparatively narrow bars 6 and 7. The bar 5 is provided with a plurality of apertures or holes 8 and 9. The apertures or holes 8 are positioned centrally of the bar, but apertures 9 are positioned off center as clearly seen in Fig. 2. Bars 6 and 7 are provided with a plurality of apertures 10 and 11 respectively that are centrally of the respective bars and are spaced the same distance apart as the corresponding apertures 8 and 9 of bar 5 so that in fitting the respective bars together a securing pin may be passed through any of the apertures 10 and 11 and also any of the apertures 8 or 9 as the case may be. In constructing bars 6 and 7 bar 6 is preferably constructed comparatively thin while bar 7 is constructed comparatively thick.

In assembling the various bars for providing a track as shown in Fig. 5 securing pins 12 are passed through apertures 8 of bar 5 and apertures 10 and 11 of bars 6 and 7. This will cause the edges of bar 5 to project a short distance beyond both above and below the bars 6 and 7 so as to accommodate grooved roller above and below on hanger 4. If it is desired to use a flat roller a track similar to that shown in Fig. 6 may be provided in which the bars 6 and 7 are placed on one side of bar 5 and securing pins 12 pass through apertures 10 and 11 of bars 6 and 7 and through apertures 9 of bar 5. This will provide a smooth surface 13 and a ridge or fender 14 so that the wheel will have a smooth track to run upon but will be prevented from being displaced therefrom.

In some hangers the bearing wheels are arranged in pairs above and below, and in order to accommodate this kind of a hanger the bar 5 is arranged between bars 6 and 7 as clearly shown in Fig. 7. In passing the securing bolts 12 through the respective bars (Fig. 7) the same are passed through apertures 10 and 11 of bars 6 and 7 and through the apertures 8 of bar 5 so that bar 5 will project equally above and below the respective bars 6 and 7. It will be evident that this form of track may be used for a pair of wheels above and below the track, or, for a single groove wheel above and below the track.

Fig. 8 has the bars arranged similar to that shown in Fig. 7 except that the securing pin 12 is passed through apertures 9 of bar 5 so that the same may project only above bars 6 and 7.

In Fig. 9 a still different arrangement is provided in which bar 5 projects below bars 6 and 7. This arrangement is caused by having the securing members 12 passing through apertures 9 of bar 5 and is substantially the arrangement shown in Fig. 6, except that the complete track is reversed or turned over.

In Fig. 10 is seen a slightly modified construction of track in which there is added a bar 5' similar to bar 5 so that a track or runway may be positioned between the two bars 5 and 5'. As shown in this figure a runway is provided above and below because the securing bolt 12' passes through the centrally positioned apertures 8 in the respective plates 5 and 5'.

In Fig. 11 is disclosed a structure somewhat similar to that shown in Fig. 10, except that the bars 5 and 5' project only above the bars 6 and 7 so that there is only one runway formed and that on the upper side of the track.

In Fig. 12 will be seen a hanger 4 which may be used in connection with my improved track though other forms of hangers will be equally well adapted to be used with the same. The hanger 4 is preferably cut from a single piece of metal and may be arranged rectangular or any other desired shape, but preferably is arranged with a neck shaped portion 15 and a triangular or spear shaped portion 16. The triangular shaped portion 16 is provided with apertures 17 through which securing means may be passed into the door into which the hanger is secured. Bolted or otherwise connected to hanger 4 are brackets 18 and 19 that are provided with apertures 20 and 21 corresponding to apertures 22 and 23 into which is positioned the journals of rollers or anti-friction members. If desired one of the brackets 18 or 19 may be omitted and simply one bracket used so that the hanger will be equally adapted for use as a single roller bracket or a double roller bracket.

What I claim is:

1. A track for sliding doors comprising a plurality of transposable bars, and means for securing the same in predetermined positions.

2. A track for sliding doors comprising a comparatively wide bar and a plurality of comparatively narrow bars, said comparatively wide bar being formed with apertures positioned centrally thereof and on a central line extending longitudinally thereof, and said comparatively narrow bars being provided with apertures arranged centrally thereof, and securing means passing through some of said apertures in all of said bars for holding said comparatively wide bar in a predetermined relationship to said comparatively narrow bars.

3. A track for sliding doors comprising a bar formed with apertures on a line extending centrally and longitudinally thereof and with apertures positioned to one side of said first mentioned apertures, a plurality of comparatively narrow bars formed with a line of apertures centrally thereof, and pins passing through some of the apertures in all of said bars for holding said bars in an adjusted position.

4. The combination with a hanger provided with anti-friction rollers, a track comprising a plurality of bars for engaging anti-friction rollers and formed with means for permitting the rearrangement thereof, a bar for spacing apart said bars, and means passing through all of said bars for firmly holding the same in position.

5. The combination with a track formed with a guiding member projecting above and below the same, of a hanger formed with brackets secured thereto, and anti-friction members held in place by said brackets for engaging said projecting members of said track.

6. In a device of the character described, a hanger having the body portion thereof formed from a single piece of material formed with apertures for accommodating retaining means, and apertures for receiving the ends of the journals of anti-friction members, and brackets removably secured to the body portion formed with apertures for accommodating the opposite end of journal members of anti-friction means which are positioned in the body portion.

In testimony whereof I affix my signature in presence of two witnesses.

JACOB SMITH.

Witnesses:
W. W. BAYLOR,
J. M. SHEFFIELD.